United States Patent [19]
Janzen

[11] 3,940,122
[45] Feb. 24, 1976

[54] QUICK ACTING CLAMPING DEVICE

[75] Inventor: Wolfgang Janzen, Wilnsdorf, Obersdorf, Germany

[73] Assignee: Amsted-Siemagkette GmbH, Sieg, Germany

[22] Filed: Apr. 16, 1974

[21] Appl. No.: 461,424

[30] Foreign Application Priority Data
Apr. 18, 1973 Germany............................ 2319686

[52] U.S. Cl. ........................ 269/23; 269/32; 269/91
[51] Int. Cl.² .......................................... B23Q 3/06
[58] Field of Search ........... 91/220; 92/165; 269/23, 269/32, 34, 48.1, 91, 93, 216, 228

[56] References Cited
UNITED STATES PATENTS

| | | | |
|---|---|---|---|
| 1,179,919 | 4/1916 | Heggie | 269/32 |
| 1,639,147 | 8/1927 | Phillips | 91/220 |
| 2,656,748 | 10/1953 | Hugo | 269/228 |
| 3,805,896 | 4/1974 | Bauer | 91/220 |
| 3,824,905 | 7/1974 | Jablonsky | 92/165 R |
| 3,830,486 | 8/1974 | Jepsen | 269/216 |

Primary Examiner—Roy Lake
Assistant Examiner—Mark S. Bicks
Attorney, Agent, or Firm—Toren, McGeady and Stanger

[57] ABSTRACT

In a quick acting clamping device a pair of pressure levers are mounted in a cylindrical housing for displacement between an unclamped position and a clamped position. In the unclamped position the pressure levers extend obliquely to the cylindrical axis of the housing and in the clamped position they extend parallel to the cylindrical axis. Movement of the pressure levers between the clamped and unclamped positions is provided by mounting one end of each of the levers in a pressure piece. The pressure piece is located in a bore in a piston mounted in another bore within the cylindrical housing. The bore in which the piston is mounted extends transversely of the housing, while the bore in the piston extends in the direction of the cylindrical axis of the housing. The housing includes passageways for introducing pressurized hydraulic fluid into the opposite ends of the bore containing the piston.

3 Claims, 2 Drawing Figures

QUICK ACTING CLAMPING DEVICE

SUMMARY OF THE INVENTION

The present invention is directed to a quick acting clamping device, in particular for clamping tools or workpieces and the like on machine tools, in which a pressure lever arrangement is mounted within a cylindrical housing for displacement between an unclamped position and a clamped position. In the unclamped position the axis of the pressure lever arrangement is disposed obliquely to the cylindrical axis of the housing while in the clamped position the axis of the lever arrangement is disposed in parallel with the cylindrical axis.

In a known quick clamping device, a preliminary clamping is obtained by manual actuation and/or by use of a wrench inserted into a socket opening in the housing. The high compressive stress required for displacing the pressure lever arrangement from its oblique position, that is its position in the unclamped state, to the parallel position, that is its position in the clamped state, is achieved by utilizing an additional wrench. Where it is necessary to actuate the clamping device twice there is, as a result, an interruption in effecting the clamping action, so that the clamping operation becomes complicated.

Therefore, it is the primary object of the present invention to provide a quick acting clamping device of the general type mentioned above, suitable in particular for clamping tools, workpieces or devices on machine tools, which affords an improved arrangement for the quick acting clamping while reducing the costs of construction.

In accordance with the present invention, the pressure lever arrangement employs a pair of pressure levers each extending from an opposite side of a pressure piece and having the form, in the unclamped state, of a bent or elbow lever. The pressure piece is mounted in a bore in a piston which is arranged for sliding movement in a bore extending transversely of the clamping direction of the levers. One of the pressure levers has its other end mounted in an abutment and the other pressure lever has its other end in contact with a part which affords the clamping action. In a quick acting clamping device of this type, the two pressure levers are brought, during a displacement of the piston, from the unclamped state where the levers extend obliquely to the cylindrical axis of the housing, to the clamped state where the levers extend parallel to the cylindrical axis. Such an arrangement is outstanding because of its space-saving construction and, further, because of its suitability for remote operation. Such remote operation can be effected pneumatically and/or electrically. Advantageously, however, the displacement of the piston is accomplished by hydraulic means.

To provide hydraulic pressurization of the piston, the housing is provided with a pair of passageways or bores, extending parallel to the housing axis, which terminate in blind bores or passageways extending transversely of the housing axis and extending into the opposite ends of the bore containing the piston. Displacement of the piston in one direction is effected by flowing a pressure medium, for instance a hydraulic oil, through one of the passageways into one end of the bore and, movement in the other direction, is achieved by flowing the pressure medium through the other passageway and into the other end of the bore containing the piston. Introduction of the pressure medium in one direction affords the clamping action while intorduction in the other direction releases the clamping action.

To simplify installation, an opening is provided in the housing in alignment with the piston bore and it is closed by a cover tightly sealed to the housing. One of the flow passageways into the bore passes through the cover and the cover is fixed to the housing by a hollow screw bolt inserted through an enlarged diameter portion of the passageway into the cover. Accordingly, the hollow screw bolt has a double function, it serves as a passageway for the pressure medium and, at the same time, secures the cover non-rotationally to the housing.

An essential feature of the present invention is the fact that the difference in length between the piston bore and the piston is approximately equal to the eccentricity of the pressure levers in the unclamped position and the clamped position. With this arrangement it is possible to assure that in the two different end positions of the piston the pressure levers are either in the unclamped or the clamped position.

The cover, mounted on the housing, is located at the end of the bore to which the piston is displaced when the pressure levers are disposed in the clamped position. An electric eontact is located in the cover and, over a line located in a longitudinally extending groove of the housing, it is connected with an instrument which indicates the clamped position of the device. By means of the electrical contact it is possible to limit any further supply of the pressure medium when the device is in the clamped position.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DETAILED DESCRIPTION OF THE INVENTION

Figure 1:
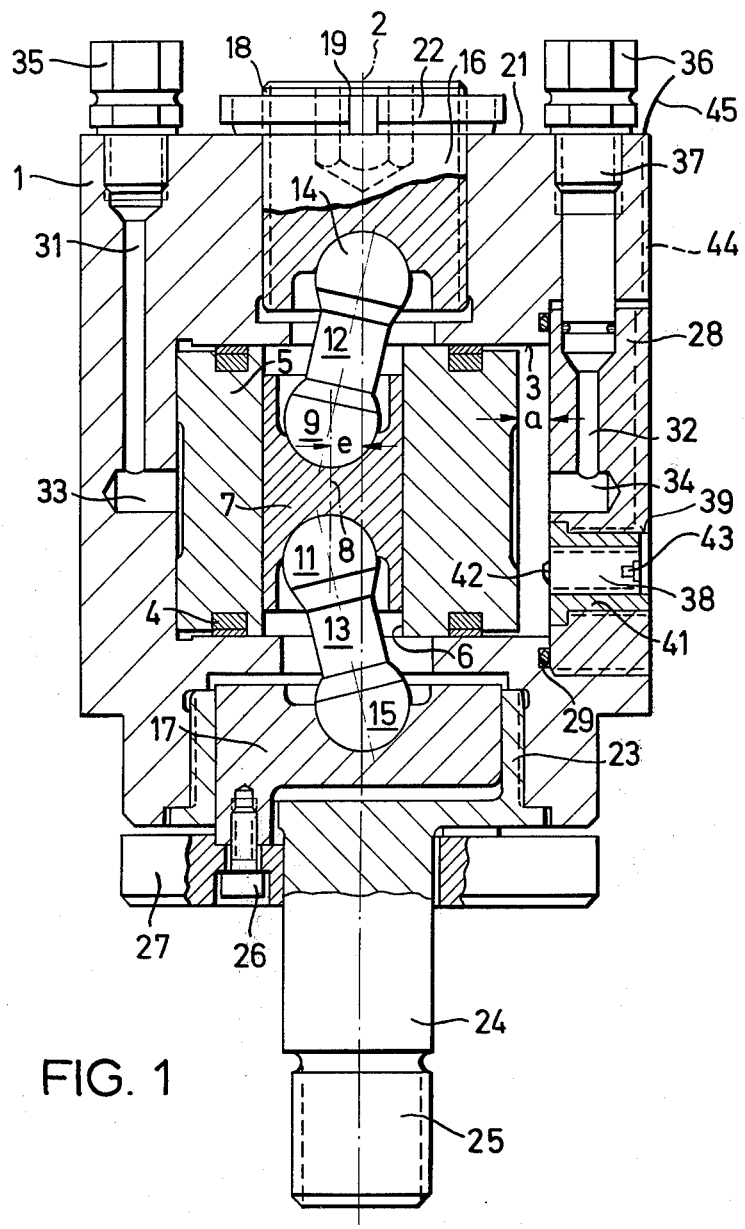
FIG. 1 is a longitudinal sectional view through a quick acting clamping device embodying the present invention.

In the drawing a quick acting clamping device is illustrated which includes a cylindrical housing 1 with a piston bore 3 extending transversely of the cylindrical axis 2 of the housing. A piston 5, having an axial dimension somewhat less than the axial dimension of the bore, is arranged for sliding movement within the bore. Adjacent the opposite ends of the piston, packing elements 4 are arranged in grooves in the piston and contact the side surfaces of the bore. Intermediate its ends, the piston 5 has a guide bore 6 which extends in parallel with the cylindrical axis 2 of the housing and a pressure member 7 is mounted for axial movement in the guide bore. It is evident, particularly from FIG. 2, that the guide bore is mounted eccentrically in the piston in a very specific manner. For a reason to be described more fully below, the eccentricity $e$ of the guide bore axis 8 relative to the cylindrical axis 2 of the housing is approximately equal to the length difference

*a* between the piston bore 3 and the piston 5.

Recesses are formed in the opposite ends of the pressure member 7 and the recesses are centered on the axis 8 of the guide bore 6. Two pressure levers 12 and 13 are associated with and each extends from an opposite end of the pressure member 7. Each of the pressure levers 12, 13 has a spherically shaped end 9, 11 seated within one of the recesses in the pressure member. The spherically shaped ends 9, 11 are located on the axis 8 of the bore 6 and are offset by the dimension *e* from the axis 2 of the cylindrical housing. The pressure levers 12 and 13 are elongated in the general direction of the axis 2 of the housing 1 and they extend in opposite directions from the pressure member 7. The opposite or outer spherically shaped end 14 of the pressure lever 12 is positioned in a recess in the inwardly facing end of an adjustment screw 16 mounted in the upper end of the housing 1, as viewed in FIG. 1. The opposite or outer spherically shaped end 15 of the pressure lever 13 is seated within a recess formed in the inwardly facing end of a clamping member 17. The adjusting screw 16 has a thread 18 on its external lateral surface for varying the extent to which it is inserted into the housing for adjusting the venting clearance of the clamping device. For this purpose the adjusting screw 16 has an internal hexagonally shpaed recess 19 and it is secured by a lock nut 22 supported on the top 21 of the housing 1.

Clamping piece 17 is mounted for axial movement within an enlarged threaded flange section 23 of a clamping pin 24. At its lower end extending outwardly from the housing 1, the clamping pin 24 has a screw-in pin 25 for threading the clamping pin into a chuck, not shown, Immediately below the housing 1, a clamping plate 27 encircles the clamping pin 24 and is connected by means of screws 26 to the clamping member 17.

In one side of the housing 1 aligned with the piston bore 3 is an opening which is closed by a cover 28. A packing ring 29 is positioned between the housing 1 and the cover 28 so that the open end of the bore is sealed in a liquid-proof manner. The piston 5 is displaced through the bore by a hydraulic medium which enters through passageways or bores 31, 32 located in the housing 1 and the cover 28 and extending parallel to the cylindrical axis 2 of the housing. As viewed in FIG. 1 the bores 31, 32 extend downwardly from the top of the housing and are intersected at their inner ends by blind bores 33, 34 which extend into the end faces of the piston bore 3. Each of the passageways or bores 31, 32 has a filling nipple 35, 36 positioned on the top 21 of the housing 1. As compared to bore 31, the bore 32 has an enlarged diameter extending downwardly through the housing 1 into the cover 28. A hollow screw bolt 37 extends downwardly through the enlarged diameter section of the bore 32 through the housing 1 into the cover 28. The hydraulic medium flows through this bolt 37 into the bore 32 and then through blind bore 34 into the end of the piston bore. Further, the bolt 37 also serves to secure the cover 28 to the housing 1 so that is does not rotate relative to the housing.

An electric contact 38 is incorporated into the clamping device and is positioned in the cover 28. The electric contact 38 consists of a sleeve 41 positioned in a bore 39 through the cover and a contact protuberance or blade 42 is formed on the end of the sleeve facing into the piston bore. On the opposite end of the sleeve 41, a contact stud 43 is positioned and is connected, via a line 45, to an indicating instrument, not shown. The line 45 extends through an upwardly extending lateral groove 44 in the surface of the housing. By means of this arrangement, the clamped position of the device can be indicated as piston 5 strikes the contact blade 42 of the electric contact 38. When contact is established, the hydraulic medium being supplied into the piston bore can be limited or cut off.

Figure 2:
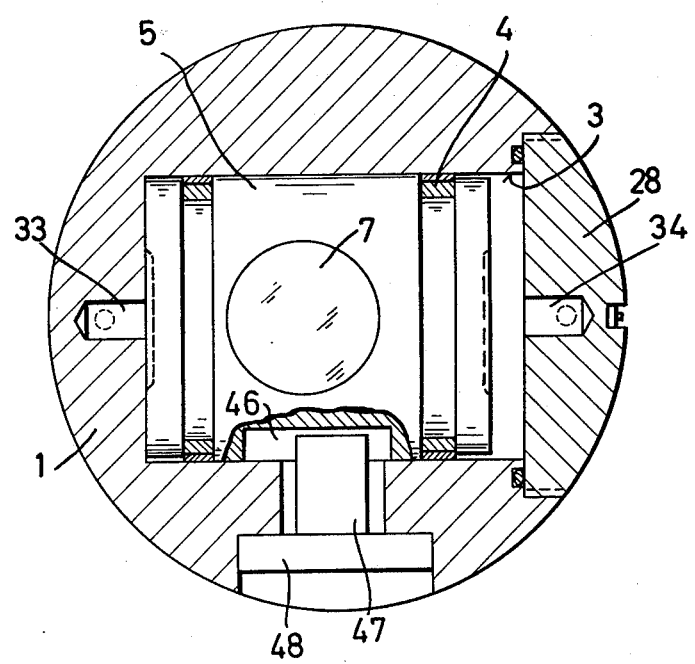
FIG. 2 is a transverse sectional view of the device shown in FIG. 1 in the median plane of the piston of the device.

To ensure that piston 5 does not rotate within its bore 3, a groove 46 is formed in the piston extending in its axial direction and a guide pin 47, mounted on a centering member 48 secured within the housing 1, extends into the groove, note FIG. 2.

The quick acting clamping device embodying the present invention acts in the following manner.

In FIG. 1 the clamping device is illustrated in the unclamped position with the ends of the pressure levers 12, 13 seated within the pressure member 7 so that the lever arrangement has an elbow or bent configuration and the axes of the levers extending between their opposite ends are disposed in an oblique position relative to the axis 2 of the housing 1. In effecting a clamping action the screw-in pin 25 of the clamping pin 24 is threaded into a chuck, not shown, provided with a corresponding thread, to the extent where the clamping plate 27 rests on the top of the part to be clamped. With the completion of this preliminary clamping movement, a certain preclamping is obtained. To achieve the final clamping action, a pressurized hydraulic medium is conveyed through the passageway 31 and the blind bore 33 into the left end of the piston bore 3, as viewed in FIG. 1. As a result, the piston 5 is displaced through the bore 3 to the right and the pressure member 7 is carried along with it. As the piston displaces the pressure member 7 to the right, the two pressure levers 12 and 13 are displaced from their oblique position, relative to the axis 2, until the axes of the pressure levers coincide with the axis 2, that is with the axis 8 of the bore being coaxial with the axis 2 of the housing. With the axis 8 of the pressure member 7 having traveled the distance *e* which is approximately equal to the difference *a* in length between the piston 5 and its bore 3, the righthand end of the piston contacts the inner surface of the cover 28 so that the contact blade 42 is actuated and over contact 43 and line 45 a pulse is conducted to the indicating instrument which signals that the clamped position has been reached.

To release the quick acting clamping device, the introduction of the pressurized hydraulic medium into the bore 3 is reversed and flows through the nipple 36, the hollow bolt 37, the passageway 32 and blind bore 34 into the piston bore 3 and the piston is moved leftward, as viewed in FIG. 1, and the pressure levers 12 and 13 are again displaced into the oblique or inclined position illustrated. In carrying out the clamping action, that is the displacement of the piston 5, a very small pressure is required, for example only a pressure of 60 bar is needed.

While a specific embodiment of the invention has been shown and described in detail to illustrate the application of the inventive principles, it will be understood that the invention may be embodied otherwise without departing from such principles.

What is claimed is:

1. Quick acting clamping device, such as for clamping tools, workpieces or devices on machine tools, comprising a cylindrical housing, an abutment mounted in said housing, a first part positioned within said housing for transferring clamping movement and being spaced from said abutment in the axial direction of said housing, a first pressure lever mounted in said housing and having its axis extending generally in the direction of the cylindrical axis of said housing and disposed between said abutment and said first part, said first pressure lever being displaceable between an unclamped position where its axis is disposed obliquely to the cylindrical axis of said housing and a clamped position where its axis is disposed substantially parallel to the cylindrical axis of said housing, wherein the improvement comprises that said housing has a first bore therethrough with the axis of the first bore extending transversely of the cylindrical axis of said housing, a piston positioned within said first bore for displacement therein in the axial direction of said first bore, said piston having an axial length less than the axial length of said bore, said piston having a second bore therethrough extending in the direction of the cylindrical axis of said housing, said first part being located within said second bore, one end of said abutment facing one end of said first part, a second part mounted within said housing and on the opposite side of said piston from said abutment and one side of said second part facing the other end of said first part, a second pressure lever having its axis extending generally in the direction of the cylindrical axis of said housing and disposed between the one side of said second part and the other end of said first part, said second pressure lever being displaceable between an unclamped position where its axis is disposed obliquely to the cylindrical axis of said housing and a clamped position where its axis is disposed substantially parallel to the cylindrical axis of said housing, said piston being displaceable through said first bore for displacing said first part in the axial direction of said first bore for moving said first and second pressure levers between the unclamped and clamped positions, means arranged in said housing for displacing said piston hydraulically, said means for hydraulically displacing said piston comprising a pair of passageways formed through said housing with each of said passageways opening into an opposite end of said first bore for introducing a pressurized hydraulic medium thereto for the displacement of said piston, said housing having an opening therein aligned with one end of said first bore, a cover sealingly secured to said housing and closing the opening aligned with the end of said first bore, one of said passageways extends through said housing and said cover to one end of said first bore, and a hollow screw bolt extending into the one of said passageways extending through said housing and cover for securing said cover to said housing.

2. Quick acting clamping device, such as for clamping tools, workpieces or devices on machine tools, comprising a cylindrical housing having a first end and a second end spaced along the cylindrical axis of said housing from said end, an abutment mounted in the first end of said housing, a first part positioned within said housing intermediate the first and second ends thereof for transmitting clamping movement and being spaced from said abutment in the cylindrical axial direction of said housing, a first pressure lever mounted in said housing and having its axis extending generally in the direction of the cylindrical axis of said housing and having one end supported in said abutment and the other end supported in said first part, said first pressure lever being displaceable between an unclamped position where its axis is disposed obliquely of the cylindrical axis of said housing and a clamped position where its axis is disposed substantially parallel to the cylindrical axis of said housing, a second part mounted in the second end of said housing on the opposite side of said first part from said abutment, a second pressure lever having its axis extending generally in the direction of the cylindrical axis of said housing and having one end supported in said second part and the other end supported in said second part and the other end supported in said first part, said second pressure lever being displaceable between an unclamped position where its axis is disposed obliquely to the cylindrical axis of said housing and a clamped position where its axis is disposed substantially parallel to the cylindrical axis of said housing, wherein the improvement comprises that said housing has a first bore therein with the axis of the first bore extending transversely of the cylindrical axis of said housing, the axially spaced ends of said first bore being closed, a piston positioned within said first bore for slidable displacement therethrough in the axial direction of said first bore, said piston having an axial length less than the axial length of said bore between its closed ends, means in said housing for effecting a pressurized fluid flow into the opposite ends of said first bore for slidably displacing said piston therein, said piston having a second bore extending therethrough with the axis of the second bore disposed in parallel relation to the cylindrical axis of said housing, said first part being located within said second bore and slidably displaceable therethrough in the axial direction of said second bore from a first position to a second position, in the first position of said first part said first and second pressure levers are located in the unclamped position where the axes of the levers are oblique to the axis of said first part and in the second position of said first part said first and second levers are located in the clamped position where the axes of said levers are parallel to the axis of said first part, said piston being displaceable through said first bore between the closed ends thereof by said means in said housing for effecting a pressurized fluid flow for displacing said first part in the axial direction of said first bore for moving the first part between the first and second positions for selectively locating said first and second pressure levers in the clamped and unclamped position, said housing having a pair of bores extending therethrough in the direction of the cylindrical axis of the housing with each bore located at an opposite end of said first bore through said housing, a blind bore extending between the adjacent closed end of said first bore and the end of the adjacent said bore extending through said housing, said housing having an opening therein aligned with one end of said first bore, a cover sealingly secured to said housing and closing the opening aligned with the end of said first bore and forming one closed end of said first bore, one of said bores extends through said housing and said cover and the blind bore connecting said bore to said first bore extends through said cover, and a hollow screw bolt extending into the one of said bores extending through said housing and said cover for securing said cover to said housing.

3. Quick acting clamping device, as set forth in claim 2, wherein an electrical contact is arranged in said cover in alignment with said piston in said first bore, said electrical contact arranged to be contacted by said piston when said first part is in the second position, an electrical line extending through said housing and said cover and connected to said electrical contact for connecting said electrical contact to an instrument for indicating the clamped position of the device, and a groove located in the outwardly facing surface of said cover and said housing and said electrical line located within said groove.

* * * * *

UNITED STATES PATENT OFFICE
CERTIFICATE OF CORRECTION

Patent No. 3,940,122        Dated February 24, 1976

Inventor(s) Wolfgang Janzen

It is certified that error appears in the above-identified patent and that said Letters Patent are hereby corrected as shown below:

On the Title Page, Item [73] should read:
    Amsted-Siemag Kette GmbH, Sieg, Germany Signed and Sealed this Twenty-sixth Day of October 1976

[SEAL]

Attest:

RUTH C. MASON
*Attesting Officer*

C. MARSHALL DANN
*Commissioner of Patents and Trademarks*